(12) United States Patent
Kingsford et al.

(10) Patent No.: US 6,203,071 B1
(45) Date of Patent: Mar. 20, 2001

(54) ROTATIONALLY ORIENTABLE FLUID HANDLING DEVICES

(75) Inventors: Kenji A. Kingsford, Devore; Thomas J. Sievers, Upland; Peter N. Nguyen, Garden Grove; Dennis S. Kwiecinski, Pasadena, all of CA (US)

(73) Assignee: Saint Gobain Performance Plastics Corp., Wayne, NJ (US)

( * ) Notice: Subject to any disclaimer, the term of this patent is extended or adjusted under 35 U.S.C. 154(b) by 0 days.

(21) Appl. No.: 09/200,627

(22) Filed: Nov. 30, 1998

(51) Int. Cl.$^7$ .................................................... F16L 35/00
(52) U.S. Cl. ................................................ 285/18; 280/93
(58) Field of Search ............................ 285/179, 133.11, 285/93, 18, 22, 429; 228/173.4, 44.5; 175/74

(56) References Cited

U.S. PATENT DOCUMENTS

| | | | |
|---|---|---|---|
| 1,936,805 | * 11/1933 | Taylor | 285/93 |
| 3,760,990 | * 9/1973 | Lindquist | 222/371 |
| 4,077,657 | 3/1978 | Trzeciak . | |
| 4,303,135 | 12/1981 | Benoit . | |
| 4,541,655 | * 9/1985 | Lasko | 285/288.1 |
| 4,817,740 | 4/1989 | Beimgraben . | |
| 4,877,092 | 10/1989 | Helm et al. . | |
| 5,029,654 | 7/1991 | Wilson et al. . | |
| 5,125,463 | 6/1992 | Livingstone et al. . | |

* cited by examiner

Primary Examiner—Terry Lee Melius
Assistant Examiner—Aaron M. Dunwoody
(74) Attorney, Agent, or Firm—Christie, Parker & Hale, LLP

(57) ABSTRACT

Fluid handling devices comprise a body having a fluid passage therethrough and a fluid inlet and outlet at passage ends. The body is formed from a non-metallic material in a number of different forms, e.g., pipe fittings, pipes, valves and the like. The body includes weldable stubs that extend outwardly therefrom that are designed to facilitate welded attachment with the weldable stubs of an adjacent fluid handling device. To facilitate accurate rotational positioning of the device vis-a-vis other adjacent devices, one or more alignment marks are positioned along the device surface. The alignment marks are positioned on the device to provide an indication of rotational position of the device about an axis running through at least one of the weldable stubs. In one embodiment, the alignment marks are integral with and placed along an outside surface of the device body. In another embodiment, the alignment marks are integral with and placed along an outside surface of the weld stubs. The number of alignment marks placed on the fluid handling device can vary depending on the particular fluid handling device geometry and application. Devices of this invention can also include stubs that are specially engineered having a compact design to facilitate welding installation by providing a desired weld crush. Additionally, devices of this invention can also include a measuring reference point integral with the body for providing a measuring point between adjacently arranged fluid handling devices.

25 Claims, 3 Drawing Sheets

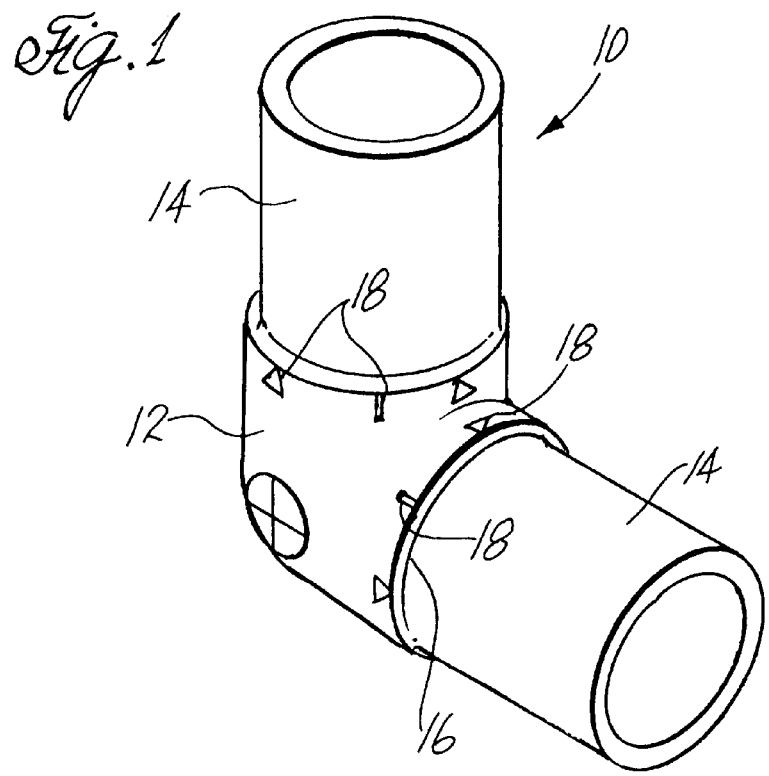
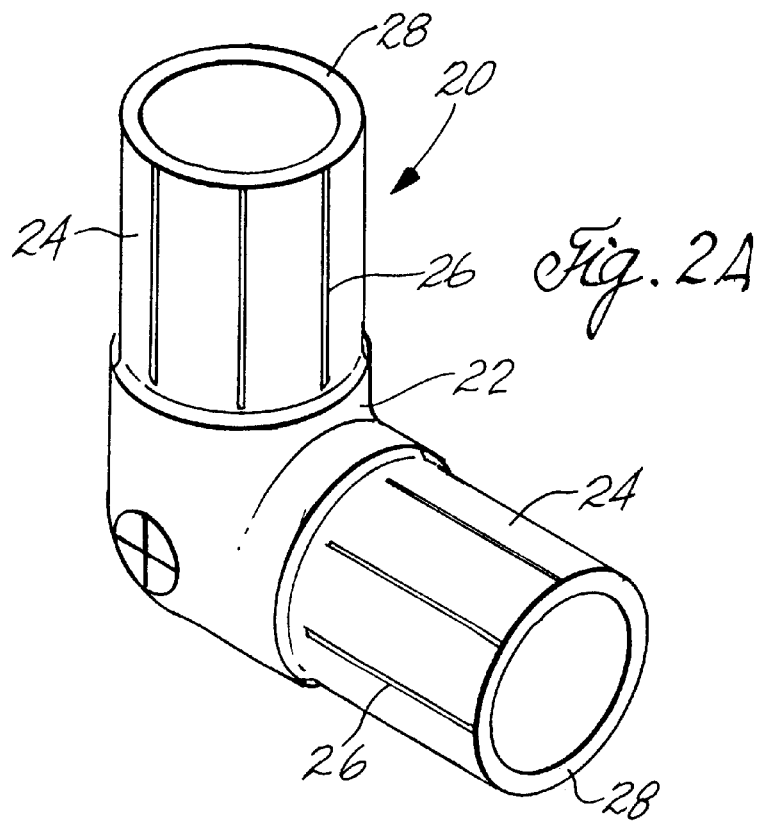

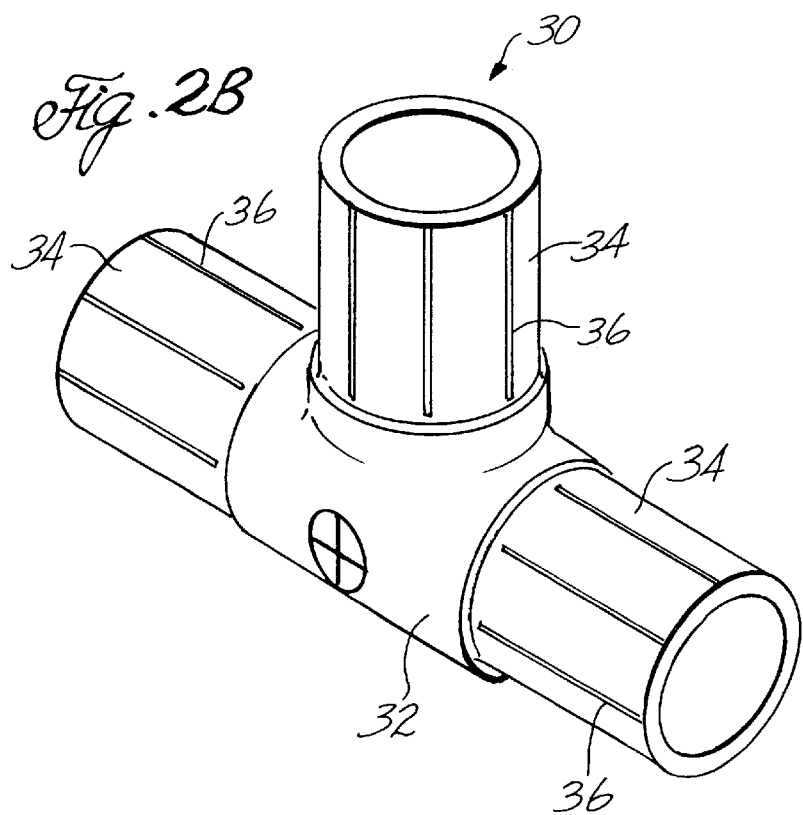
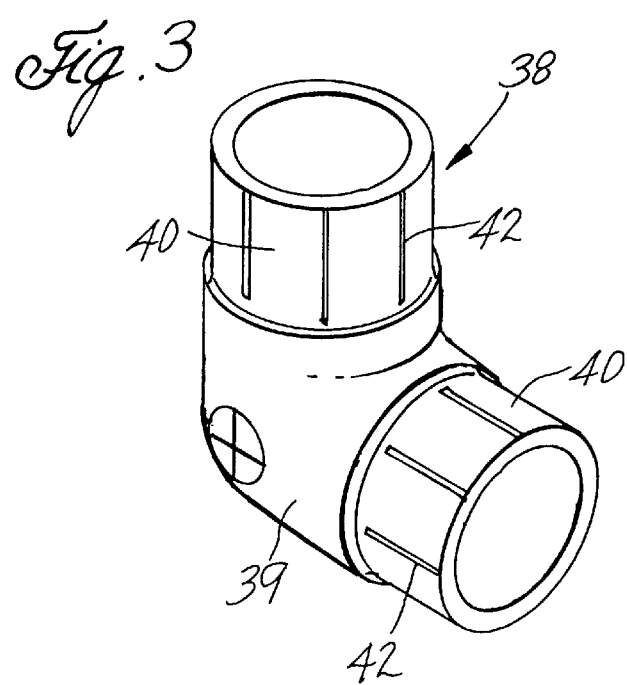

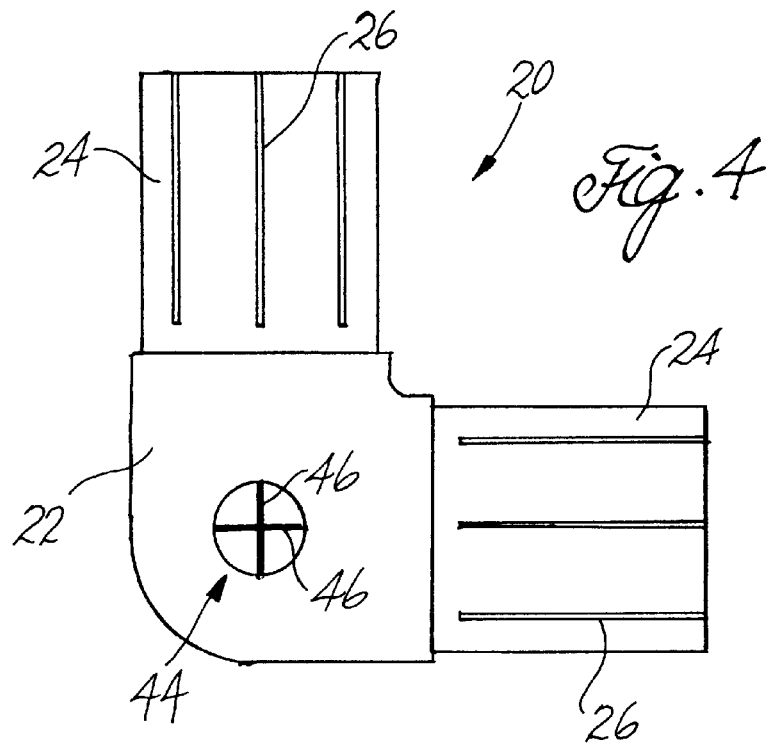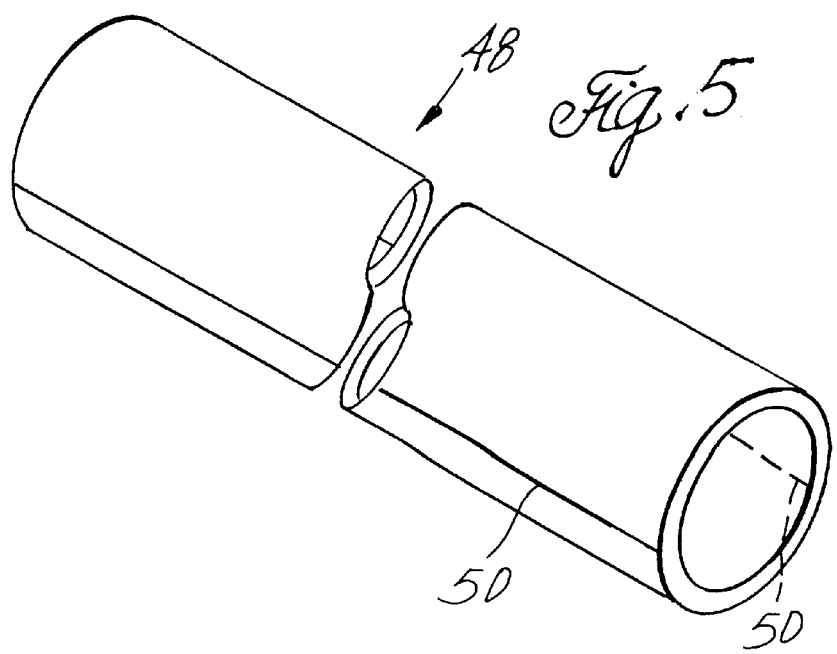

ROTATIONALLY ORIENTABLE FLUID HANDLING DEVICES

FIELD OF THE INVENTION

This invention relates to fluid handling devices that are attached together to form a fluid handling system and, more particularly, to fluid handling devices that are configured to provide an indication regarding the relative rotational orientation of one fluid handling device to another fluid handling device along an axis extending therebetween to facilitate assembly and installation.

BACKGROUND OF THE INVENTION

Fluid handling devices such as pipes, pipe fittings, valves and the like formed from plastic materials are attached together by weld process. The fluid handling devices can be attached together in a variety of combinations to meet the particular needs of a fluid handling system. In each such system the fluid handling devices are each attached together in the same manner, at stub ends extending from each respective fluid handling device. However, the process of building the fluid handling system involves not only attaching the fluid handling devices together but orienting each fluid handling device in a desired position relative to the other fluid handling devices making up the system.

When building a fluid handling system from conventional plastic fluid handling devices a large amount of time is spent aligning and axially orienting, i.e., orienting the rotational placement of the device relative to an axis of the stub, each fluid handling device before its attachment by weld method. Depending on the number and types of fluid handling devices used to form a particular system, the time that is spent ensuring the desired axial orientation can represent the majority of time spent assembling the system.

Additionally, when fluid handling systems are formed using conventional plastic fluid handling devices a large amount of time is spent during assembly preparing the stub ends of each respective fluid handling device for welding. To ensure that a proper weld is formed between the stub ends of it is necessary that the stub ends be trimmed, squared and faced prior to welding. A stub end that is not prepared will produce a weld that does not have a uniform crush, i.e., the amount of the weld stub that is deformed to provide the desired weld. For example, a stub end that is not squared off will produce a weld having a weld crush that is greater that required to form a secure attachment in some areas, and that is less than required to form a secure bond at other areas. The pre-assembly step of trimming ensures that a uniform weld crush results and a secure weld is formed.

Accordingly, it is desired that a plastic fluid handling device be constructed in a manner that facilitates the assembly process by reducing the amount of time spent to ensure a desired device attachment orientation. It is also desired that a plastic fluid handling device be constructed in a manner that facilitates and speeds up the assembly process by eliminating the need to prepare the stub ends by trimming before welding.

SUMMARY OF THE INVENTION

Fluid handling devices, constructed according to principles of this invention comprise a body having a fluid passage therethrough and a fluid inlet and outlet at opposite passage ends. The device body is formed from a non-metallic material and be in a number of different forms, e.g., pipe fittings, pipes, valves and the like. The device body includes weldable stubs that extend outwardly therefrom, that define at least one of the body fluid inlet or body fluid outlet, and that are designed to facilitate welded attachment with the weldable stubs of an adjacent fluid handling device. To facilitate accurate rotational positioning of the device vis-a-vis other adjacent devices, one or more alignment marks are positioned along the device surface. The alignment marks are positioned on the device to provide an indication of rotational position of the device about an axis running through at least one of the weldable stubs.

In one fluid handling device embodiment, the alignment marks are integral with and placed along an outside surface of the device body. In another embodiment, the alignment marks are integral with and placed along an outside surface of the weld stubs. The number of alignment marks placed on the fluid handling device can vary depending on the particular fluid handling device geometry and application.

Fluid handling devices of this invention can also include stub ends that are specially engineered having a compact design to facilitate welding installation by providing a desired weld crush. Additionally, fluid handling devices of this invention can also include measuring point means positioned on the device body for providing a measuring point between adjacently arranged fluid handling devices.

DESCRIPTION OF THE DRAWINGS

These and other features and advantages of the present invention will become appreciated as the same becomes better understood with reference to the specification, claims and drawings wherein:

FIG. 1 is a perspective side view of a first embodiment fluid handling device in the form of a pipe fitting constructed according to principles of this invention comprising integral alignment marks;

FIGS. 2A and 2B are perspective side views of a second embodiment fluid handling device in the form of a pipe fitting constructed according to principles of this invention comprising orientable weld stubs having integral alignment marks;

FIG. 3 is a perspective side view of a second embodiment fluid handling device in the form of a pipe fitting constructed according to principles of this invention comprising orientable weld stubs having integral alignment marks and having a compact design;

FIG. 4 is a side view of the fluid handling device of FIG. 2A illustrating an integral measurement reference point constructed according to principles of this invention; and FIG. 5 is a perspective side view of a fluid handling device in the form of a pipe constructed according to principles of this invention comprising orientable weld stubs having integral alignment marks.

DETAILED DESCRIPTION OF THE INVENTION

Fluid handling devices prepared according to principles of this invention comprise one or more orientation or alignment marks disposed thereon to facilitate rotationally orienting the fluid handling device relative to another fluid handling device to which it will be attached. The alignment marks can be positioned at different locations on the device as long as the marks serve provide an indication of the relative rotational position of the device about an axis passing through weldable stubs extending therefrom. Additionally, fluid handling devices of this invention comprise weldable stubs that are both compact in design and that have stub ends that are specially engineered to facilitate welding to other such stub ends without the need to trim, square or face before welding. Further, fluid handling devices of this invention can comprise a specially engineered reference point on its body to provide a point of reference for measuring the distance between pre-assembled fluid handling devices. Together these design features enable such fluid handling devices to be assembled in a reduced amount of time, and with a reduction of wasted material, when compared to conventional plastic fluid handling devices.

Referring to FIG. 1, a first embodiment fluid handling device in the form of a pipe fitting 10 is constructed, according to principals of this invention, comprising a fitting body 12 having weldable stubs 14 projecting outwardly away from a body shoulder 16. The weld stubs define one or more fluid flow inlets or outlets into the fitting body and are in fluid flow communication with a fluid flow passageway that passes through the fitting body. The pipe fitting illustrated is in the form of a 90 degree elbow, however, it is to be understood that this particular fitting is illustrated for purposes of example and reference only and is not intended to limit the types and shapes of pipe fittings provided within the scope of this invention. For example, pipe fittings in the form of elbows, tees, union tees, union adapters having one threaded end and one weld stub end, elbow adapters having one threaded end and one weld stub end, tee adapters having a variety of threaded end and weld stub end arrangements are all within the scope of this invention. FIG. 2B, for example, illustrates a pipe fitting embodiment of this invention in the form of a tee.

The first embodiment device 10 is formed from a non-metallic plastic material. In an example embodiment, the pipe fitting body and weld stubs are integral with one another and are formed from the same material. In an example embodiment, useful for transporting high-purity process liquids used in the semiconductor manufacturing process, the first embodiment pipe fitting 10 is molded from a fluoropolymeric material such as tetrafluoroethylene (TFE), polytetrafluoroethylene (PTFE), fluorinated ethylene-propylene (FEP), perfluoroalkoxy fluorocarbon resin (PFA), polychlorotrifluoroethylene (PCTFE) ethylene-chlorotrifluoroethylene copolymer (ECTFE), ethylene-tetrafluoroethylene copolymer (ETFE), polyvinylidene fluoride (PVDF), polyvinyl fluoride (PVF) and the like. In a preferred embodiment the first embodiment pipe fitting is molded from PFA.

The first embodiment device 10 comprises one or more orientation or alignment marks 18 that are positioned in such a manner as to provide an indication of the relative rotational orientation of the pipe fitting about an axis running through the weld stub 14. It is to be understood that the exact placement of the alignment marks on the pipe fitting can vary as long as the position that is selected permits the marks to function in the manner indicated. In an example embodiment, the alignment marks 18 are positioned along fitting body 12 adjacent the shoulder 16. The number of alignment marks 18 disposed along the pipe fitting can vary depending on the type of pipe fitting, e.g., elbow, tee and the like, that is manufactured, and the particular final application. For example, in a first embodiment pipe fitting, alignment marks can be placed at regular intervals around each respective body shoulder, e.g., at 15, 30, 45, 60, 90 and 180 degree intervals. The fluid handling device 10 illustrated in FIG. 1 comprises two sets of alignment marks, each set positioned adjacent a respective shoulder 16 an comprising eight alignment marks positioned at 45 degree intervals.

The alignment marks 18 can be in the form of raised projections or can be in the form of recessed indentations. The particular form of alignment mark will depend on the process that is used to manufacture the pipe fitting, e.g., machine or mold process. In an example embodiment, the alignment marks are in the form of molded projections. In order to provide a rotational orientation function, the alignment marks in each set must be aligned with one another. Configured in this manner, one assembling a fluid handling system is able to plan and control the relative rotational orientation of each fluid handling device by simply coordinating the placement of alignment marks between adjacent devices.

FIG. 2A illustrates a second embodiment fluid handling device in the form of a pipe fitting 20 comprising a fitting body 22 and weld stubs 24 projecting therefrom. The body and weld stubs are integral with one another and formed from the same materials in the same manner as described above for the first pipe fitting embodiment. The second embodiment device 20 includes one or more alignment marks 26 each positioned axially along an outside surface of the weld stubs 24. Like the first embodiment, the alignment marks 24 are integral with the weld stub surface and can be molded or machined therein. In an example embodiment, the alignment marks 36 are molded into the weld stub surface and are in the form of a raised projection. The alignment marks 26 can extend axially along the entire length of the stub or only a partial distance. To ensure easy use during the assembly process, however, it is desired that the alignment mark extend a sufficient distance along the stub to reach a stub end 28.

As discussed above, the exact number of alignment marks 26 positioned along the stub surface will vary depending on the particular type of pipe fitting and the particular fluid handling system being assembled. The device can have more than one alignment mark 26 positioned at regular intervals around the stub, e.g., every 15, 30, 45, 60, 90, and 180 degrees. FIG. 2, for example, illustrates a pipe fitting 20 having eight alignment marks positioned along the stub surface at 45 degree intervals.

FIG. 2B illustrates another second embodiment device pipe fitting 30 this time in the shape of a tee comprising a fitting body 32 and three weld stubs 34 extending therefrom. This particular embodiment is provided to illustrate that pipe fittings of this invention can be in a number of different forms. Each weld stub 34 includes a set of alignment marks 36 that extend axially along an outside stub surface. As discuss above, the number of alignment marks 36 can vary and depends on the particular pipe fitting geometry and final application. In an example embodiment, each weld stub 34 comprises a set of eight alignment marks 36 positioned at 45 degree intervals from one another.

FIG. 3 illustrates a still other second embodiment fluid handling device in the form of a pipe fitting 38, constructed according to principals of this invention, made from the same materials and comprising a fitting body 39, weld stubs 40, and one or more alignment marks 42 as discussed above. In addition, the pipe fitting 38 is engineered having a compact design with weld stubs 40 having a reduced axial length. In an example embodiment, e.g., a 45 degree elbow having an inside diameter of approximately two inches (51 mm), the stub length is approximately ½ inches (13 mm), contrasted with a conventional weld stub length for the same diameter pipe fitting of approximately 1½ inches (38 mm).

It is desired that the compact stub length be less than about ¾ inches, and preferably within the range of from ¼ to ¾ inches, at least for pipe fittings and other fluid handling devices having an inside diameter ranging from ¼ to 2 inches. A stub length within this range is desired because it both minimizes the amount of material necessary to provide a suitable weld, and provides a weld having a desired weld strength. For example, a weld stub having a length of less than ¼ inch will provide a degree of heat dissipation that will not provide a weld having a desired weld strength. Additionally, a weld stub having a length of less than ¼ may require use of a special weld fixture, complicating the assembly process more than if using standard weld fixtures. A weld stub having a length greater than ¾ inch provides more material than is necessary to produce a desired weld. A compact stub length of approximately ½ inches is preferred because it enable the device to be welded using standard weld fixtures, and because it will provide a sufficiently strong butt fusion weld. Additionally, the use of a ½ inch compact stub length enables fluid handling devices to be assembled into a system, allowing a 0.03 to 0.04 inch weld crush, rapidly and without the need for material trimming.

The weld stub is intentionally engineered having both a compact design and having a squared-off, and smooth stub end 26 to facilitate assembly and reduce assembly time. Specifically, the compact weld stub design provides for up to a 50 percent reduction in assembly time because it eliminates the need to cut, square and face each weld stub prior to welding. Additionally, the compact weld stub design serves to: (1) reduce the overall system footprint by reducing unnecessary run length between attached fluid handling devices; (2) reduce unwanted hold-up volume due to reduced fitting size; and (3) reduce overall product cost due to material savings. Although the compact pipe fitting illustrated in FIG. 3 has been shown in the form of a second embodiment pipe fitting, i.e., one having the alignment marks positioned along the sub surface rather that at the fitting body shoulder, it is to be understood that first embodiment pipe fittings of this invention can be constructed having the compact stub feature.

FIG. 4 is a side view of the second embodiment fluid handling device 20 described above and illustrated in FIG. 2A that more clearly illustrates a measuring point means 44 positioned on the fitting body 22. The measuring point means 44 is positioned along an outside surface of the fitting body 22 at a location that is readily accessible for use as a measuring reference point when placing the fluid handling devices together and measuring the same for assembly into a desired fluid handling system. In an example embodiment, the measuring point means 44 is in the form of a cross having two intersecting perpendicular lines 46, wherein each such line is parallel to an axis running though a respective weld stub. The measuring point means 44 is integral with the fitting body and can either be molded or machined therein in the form of a recessed or raised surface feature. In the example embodiments illustrated in FIGS. 1, 2A, 2B, 3 and 4 the measuring point means is centered at opposite sides of the filling body and includes perpendicular intersecting lines that are centered along an axis running along at least two of the weld stubs. Use of the measuring point means eliminates guessing and enables the fluid handling devices to be positioned and measured accurately vis-a-vis one another, thereby reducing staging and assembly time, and providing a fluid handling system having accurately positioned devices.

FIG. 5 illustrates a fluid handling device in the form of a pipe 48 formed from the same materials as discussed above. The pipe includes one or more alignment marks 50 as discussed above positioned axially along an outside pipe surface. Like the pipe fittings described above and illustrated in FIGS. 1 to 4, the alignment marks 50 on the pipe are used to provide an indication of relative axial orientation when attached to a pipe fitting or other fluid handling device that, unlike a pipe, contains a rotational orientation specific structural features.

Although limited embodiments of fluid handling devices comprising alignment marks and/or compact weld stub designs, and or measuring point means have been specifically described and illustrated herein, and specific dimensions have been disclosed, many modifications and variations will be apparent to those skilled in the art. Accordingly, it is to be understood that, within the scope of the appended claims, fluid handling devices and fluid handling systems comprising such devices according to principles of this invention may be embodied other than as specifically described herein.

What is claimed is:

1. A fluid handling device comprising:
   a body formed from a non-metallic material and having a fluid flow passage therethrough, and having a fluid inlet and fluid outlet in fluid flow communication therewith;
   at least one weldable stub integral with and extending from the body, the weldable stub defining one of the fluid inlet or fluid outlet;
   one or more alignment marks positioned along an outside surface of the device to provide an rotational indication of the body relative to an axis running tnrough the weldable stub; and
   measuring point means integral with the device body and positioned thereon for providing a measuring reference point between the device and an adjacent fluid handling device coupled to the weldable stub.

2. The fluid handling device as recited in claim 1 wherein the body is formed from a fluoropolymeric material selected from the group consisting of tetrafluoroethylene, polytetrafluoroethylene, fluorinated ethylene-propylene, perfluoroalkoxy fluorocarbon resin, polychlorotrifluoroethylene, ethylene-chlorotrifluoroethylene copolymer, ethylene-tetrafluoroethylene copolymer, polyvinylidene fluoride, and polyvinyl fluoride.

3. The fluid handling device as recited in claim 1 wherein the one or more alignment marks are positioned on the device body.

4. The fluid handling device as recited in claim 1 wherein the one or more alignment marks are positioned axially along a surface of the weldable stub.

5. The fluid handling device as recited in claim 4 comprising a number of alignment marks positioned at regular intervals around the surface of the weld stub, and wherein the alignment marks are integral with the weld stub.

6. The fluid handling device as recited in claim 5 wherein the alignment marks are positioned at 45 degree intervals.

7. The fluid handling device as recited in claim 1 wherein the weldable stub extends outwardly away from the body less than about ¾ inches.

8. The fluid handling device as recited in claim 7 wherein the weldable stub extends outwardly away from the body approximately ½ inches.

9. The fluid handling device as recited in claim 1 wherein the measuring point means is a pair of perpendicular intersecting lines each parallel with the direction of fluid flow though the device.

10. A fluid handling device comprising:
    a body formed from a non-metallic material and having a fluid flow passage therethrough, and having a fluid inlet and fluid outlet in fluid flow communication therewith;

at least two weldable stubs integral with and extending from the body, the weldable stubs defining one of the fluid inlet or fluid outlet, each weldable stub having a number of alignment marks disposed at regular intervals along respective weld stub outside surfaces to provide a rotational indication of the body relative to an axis running through the weldable stubs, and wherein the position of the alignment marks of each weld stub correspond with one another.

11. A fluid handling device comprising:

a body formed from a non-metallic material and having a fluid flow passage therethrough, and having a fluid inlet and fluid outlet in fluid flow communication therewith;

at least one weldable stub integral with and extending from the body, the weldable stub defining one of the fluid inlet or fluid outlet and having a pre-formed squared-off and smooth edge to facilitate welded attachment; and one or more alignment marks positioned along an outside surface of the device to provide a rotational indication of the body relative to an axis running through the weldable stub.

12. A fluid handling device comprising:

a body formed from a fluoropolymeric material, having a fluid flow passage therethrough and having a fluid inlet and fluid outlet in fluid flow communication therewith;

at least one weldable stub integral with and extending from the body, the stub defining one of the fluid inlet or fluid outlet;

a number of alignment marks integral with and disposed axially along an outside surface of the weldable stub at regular intervals to provide an orientation indication of the body relative to an axis running through the stub; and measuring point means integral with the device body and positioned thereon to provide a measurement reference point between the device body and an adjacent fluid handling device coupled to the at least one weldable stub.

13. The fluid handling device as recited in claim 12 wherein the measuring point means is in the form of one or more lines that are parallel with an axis running through weldable stub, and a second line is parallel with a axis running the at least one weldable stub.

14. The fluid handling device as recited in claim 12 wherein the body is formed from a fluoropolymeric material selected from the group consisting of tetrafluoroethylene, polytetrafluoroethylene, fluorinated ethylene-propylene, perfluoroalkoxy fluorocarbon resin, polychlorotrifluoroethylene, ethylene-chlorotrifluoroethylene copolymer, ethylene-tetrafluoroethylene copolymer, polyvinylidene fluoride, and polyvinyl fluoride.

15. The fluid handling device as recited in claim 12 wherein the alignment marks are positioned at 45 degree intervals.

16. The fluid handling device as recited in claim 12 wherein the weldable stub extends from the body less than about ¾ inches.

17. The fluid handling device as recited in claim 16 wherein the weldable stub extends from the body in the range of from about ¼ to ¾ inches.

18. The fluid handling device as recited in claim 16 wherein the weldable extends from the body approximately ½ inches.

19. A fluid handling device comprising:

a body formed from a fluoropolymeric material, having a fluid flow passage therethrough and having a fluid inlet and fluid outlet in fluid flow communication therewith;

at least one weldable stub integral with and extending from the body, the stub defining one of the fluid inlet or fluid outlet and having a pre-formed squared-off and smooth edge to facilitate welded attachment; and a number of alignment marks integral with and disposed axially along an outside surface of the weldable stub at regular intervals to provide an orientation indication of the body relative to an axis running through the stub.

20. A fluid handling device comprising:

a body formed from a fluoropolymeric material, having a fluid flow passage therethrough and having a fluid inlet and fluid outlet in fluid flow communication therewith;

a first weldable stub integral with and extending from the body, the stub defining the fluid inlet;

a second weldable stub integral with and extending from the body, the stub defining the fluid outlet;

a number of alignment marks integral with and disposed axially along an outside surface of each weldable stub at regular intervals to provide an rotational indication of the body relative to an axis running through each stub;

wherein each weldable stub has a sufficient length to provide a weld crush of in the range from 0.03 to 0.04 inches, and has a pre-formed squared-off edge to facilitate welded attachment.

21. The fluid handling device as recited in claim 20 wherein the body is formed from a fluoropolymeric material selected from the group consisting of tetrafluoroethylene, polytetrafluoroethylene, fluorinated ethylene-propylene, perfluoroalkoxy fluorocarbon resin, polychlorotrifluoroethylene, ethylene-chlorotrifluoroethylene copolymer, ethylene-tetrafluoroethylene copolymer, polyvinylidene fluoride, and polyvinyl fluoride.

22. The fluid handling device as recited in claim 20 wherein the alignment marks are positioned at 45 degree intervals.

23. A fluid handling system comprising a number of fluid handling devices as recited in claim 20, wherein each such fluid handling device is welded together at respective weldable stubs such that the alignment marks of the welded together stubs are parallel with one another.

24. The fluid handling device as recited in claim 20 further comprising measuring point means integral with the device body to provide a measurement reference point relative to an adjacent fluid handling device.

25. The fluid handling device as recited in claim 24 wherein the measuring point means is in the form of two perpendicular intersecting lines, wherein a first line is parallel with an axis running through a first weldable stub, and a second line is parallel with a axis running through a second weldable stub.

* * * * *

UNITED STATES PATENT AND TRADEMARK OFFICE
CERTIFICATE OF CORRECTION

PATENT NO.   : 6,203,071 B1
DATED        : March 20, 2001
INVENTOR(S)  : Kenji A. Kingsford et al.

It is certified that error appears in the above-identified patent and that said Letters Patent is hereby corrected as shown below:

Column 6,
Line 26, replace "an rotational" with -- a rotational --.
Line 56, replace "inches" with -- inch --.
Line 59, replace "inches" with -- inch --.

Column 7,
Line 60, replace "inches" with -- inch --.
Line 63, replace "inches" with -- inch --.

Column 8,
Line 2, after "weldable" insert -- stub --.
Line 3, replace "inches" with -- inch --.
Line 28, replace "an rotational" with -- a rotational --.
Line 33, replace "inches" with -- inch --.
Line 61, replace "a axis" with -- an axis --.

Signed and Sealed this

Twenty-third Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,203,071 B1
DATED          : March 20, 2001
INVENTOR(S)    : Kenji A. Kingsford et al.

It is certified that error appears in the above-identified patent and that said Letters Patent is hereby corrected as shown below:

Column 7,
Line 44, delete "weldable stub, and a second line is parallel with a axis".
Line 45, delete "running".

Signed and Sealed this

Ninth Day of December, 2003

JAMES E. ROGAN
*Director of the United States Patent and Trademark Office*